United States Patent
Shiba et al.

(10) Patent No.: US 6,701,212 B2
(45) Date of Patent: Mar. 2, 2004

(54) LOST MOTION CORRECTION SYSTEM AND LOST MOTION CORRECTION METHOD FOR NUMERICAL CONTROL MACHINE TOOL

(75) Inventors: Kazuhiro Shiba, Shizuoka-ken (JP); Sadaji Hayama, Tochigi-ken (JP); Minoru Hamamura, Shizuoka-ken (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 134 days.

(21) Appl. No.: 09/734,725

(22) Filed: Dec. 13, 2000

(65) Prior Publication Data

US 2001/0005800 A1 Jun. 28, 2001

(30) Foreign Application Priority Data

Dec. 13, 1999 (JP) .......................................... P11-353574

(51) Int. Cl.[7] .............................................. G06F 19/00
(52) U.S. Cl. ..................... 700/193; 700/192; 700/186
(58) Field of Search ................................. 700/193, 192, 700/66, 57, 64, 186; 318/632

(56) References Cited

U.S. PATENT DOCUMENTS

| | | | | |
|---|---|---|---|---|
| 4,800,325 A | * | 1/1989 | Nakanishi .................... 318/605 |
| 4,855,657 A | * | 8/1989 | Isobe et al. .................. 318/602 |
| 4,961,034 A | * | 10/1990 | Kakino et al. ............... 318/561 |
| 5,101,146 A | * | 3/1992 | Teshima ...................... 318/561 |
| 5,214,592 A | * | 5/1993 | Serizawa et al. ............ 700/193 |
| 5,246,316 A | * | 9/1993 | Smith .......................... 33/638 |
| 5,329,457 A | * | 7/1994 | Hemmerle et al. .......... 318/572 |
| 5,375,066 A | * | 12/1994 | Yee et al. .................... 700/193 |
| 5,895,181 A | * | 4/1999 | Ito et al. ...................... 409/132 |
| 6,060,854 A | * | 5/2000 | Yutkowitz .................... 318/574 |
| 6,107,771 A | * | 8/2000 | Maeda ......................... 318/630 |

FOREIGN PATENT DOCUMENTS

JP          08-263117          10/1996

* cited by examiner

*Primary Examiner*—Leo Picard
*Assistant Examiner*—Alexander Kosowski
(74) *Attorney, Agent, or Firm*—Finnegan, Henderson, Farabow, Garrett & Dunner, L.L.P.

(57) ABSTRACT

A lost motion correction value setting method for a machine tool of a hybrid control system that performs a positional loop control with both machine position signals outputted from position detecting scales for detecting machine positions and motor position signals outputted from rotary encoders for detecting a rotational angle of a feed driving servomotor includes executing a test program; periodically inputting the machine position signals outputted from the position detecting scale and the motor position signals outputted from the rotary encoder; determining errors by determining the difference between the machine position signals and the motor position signals, determining the difference between an average value on an advance side and an average value on a return side of the errors, and storing the difference in lost motion correction value memories as a dynamic lost motion correction value.

13 Claims, 8 Drawing Sheets

FIG.4

DATA TABLE

| TABLE POSITION | | LM CORRECTION VALUE | | | | | | | | | | |
|---|---|---|---|---|---|---|---|---|---|---|---|---|
| | | DYNAMIC | | | | | | | | | STATIONERY | |
| | | ARCUATE INTERPOLATION | | | | | LINEAR INTERPOLATION | | | | | |
| X | Y | SPEED-1 | SPEED-2 | SPEED-3 | SPEED-4 | SPEED-5 | SPEED-1 | SPEED-2 | SPEED-3 | SPEED-4 | | |
| 1 | 1 | | | | | | | | | | | |
| 1 | 2 | | | | | | | | | | | |
| 1 | 3 | | | | | | | | | | | |
| 1 | 4 | | | | | | | | | | | |
| 1 | 5 | | | | | | | | | | | |
| 1 | 6 | | | | | | | | | | | |
| 1 | 7 | | | | | | | | | | | |

LINEAR INTERPOLATION
(DYNAMIC LM MEASUREMENT)

LINEAR INTERPOLATION (STATIONERY LM MEASUREMENT)

LOST MOTION CORRECTION SYSTEM AND LOST MOTION CORRECTION METHOD FOR NUMERICAL CONTROL MACHINE TOOL

BACKGROUND OF THE INVENTION

1. Field of the Invention

This invention relates to a lost motion correction system and a lost motion correction method for a numerical control machine tool. This invention further relates to a lost motion correction value setting method for a machine tool of a hybrid control system, a computer readable recording medium for recording a program for executing this method on a computer, and a numerical control machine tool.

2. Description of Relevant Art

The numerical control machine tool includes a holding and processing portion for holding and processing a workpiece in a space defined by imaginary axes, and a numerical controller for providing electrical control commands for causing the holding and processing portion to make necessary actions. The numerical control machine tool has drives by axes that mechanically act in dependence on the control commands, and a group of mechanical elements that transmit mechanical actions of the drives to the holding and processing portion. A transmission system for mechanically transmitting the control commands to a position for the workpiece to be held and/or processed is constituted by the mechanical element group and mechanical elements of the drives and the holding and processing portion.

The numerical controller calculates reverse functions of transmission functions by axes of the transmission system, with respect to necessary actions of the holding and processing portion, to thereby obtain the control commands.

However, mechanical elements of the transmission system are respectively real rigid bodies and, when operated, have engagement slips at their meshing engagement parts or frictional engagement parts, deformations by elongation and deflection depending on acting forces, and thermal deformations depending on their temperatures. Amounts of such slips and deformations have their components by axes, of which integrations along the transmission system give values that represent errors between the control commands and real actions of the holding and processing portion.

Among the errors, such an error that occurs due to a directional difference in motion of the holding and processing portion, or more specifically, a positioning error occurring between a positioning to an identical target point in a positive sense (at an advance side) and that in a negative sense (at a return side) is called a lost motion error.

The lost motion error is caused by a backlash due to loose engagement in and a windup due to deflection of mechanical elements. It has delicate variations depending on acting conditions of respective elements, and is difficult to be estimated by calculations.

In the past, therefore, the numerical control machine tool was operated for a trial run, where lost motion errors were measured as detail as possible and lost motion correction values for canceling them were parametrically set, and control commands for actual processing were corrected by the set correction values to thereby effect a lost motion correction.

For example, in Japanese Patent Application Laid-Open Publication No. 8-263117, there has been proposed measuring lost motion errors at a plurality of processing positions for each of a plurality of feed speeds, and respectively setting corresponding lost motion correction values.

For this reason, in the past, in adjustment at the maker end factory of a numerical control machine tool or in installation at the user end factory, there was employed a high-precision measurement machine such as a laser measurement machine, so that machine positions were actually measured by a maker side engineer taking a long time, and then a careful trial run was repeated for measurement of lost motion errors.

It therefore was difficult to perform, at the user end alone, resetting lost motion correction values in accordance with a condition of use of the numerical control machine tool.

SUMMARY OF THE INVENTION

This invention was made with the above-noted point in view. It is an object of this invention to provide a lost motion correction method and a lost motion correction system for a numerical control machine tool that allows a necessary precision for processing to be kept by measuring lost motion errors with their dynamical properties in view, even with a moderated measuring precision.

It also is an object of this invention to provide a lost motion correction value setting method for a machine tool of a semi-close/full-close hybrid loop control system, in which lost motion errors can be measured without employing a measuring machine of a particularly high precision, and lost motion correction values can be set at the user end alone, as well as a computer readable recording medium for recording a program for executing this method on a computer, and a numerical control machine tool.

To achieve the object, according to a first aspect of the invention, there is provided a lost motion correction method for a numerical control machine tool for correcting a lost motion error of a mechanical transmission system including a first mechanical element to be operated in accordance with a control command from a control program and a second mechanical element for positioning a control object to target positions. This lost motion correction method comprises detecting an operated amount of the first mechanical element, detecting an operated position of the second mechanical element, recognizing from the control program that the control object stops at a first target position, calculating a stationary lost motion error as a lost motion error along a motion stop of the mechanical transmission system upon a positioning of the control object to the first target position, based on the operated amount of the first mechanical element and the operated position of the second mechanical position, setting a first lost motion correction value for canceling the stationary lost motion error, and correcting, by the first lost motion correction value, a first control command for positioning the control object to the first target position.

According to a second aspect of the invention, a lost motion correction method according to the first aspect further comprises recognizing from the control program that the control object changes a moving direction at a second target position, calculating a dynamic lost motion error as a lost motion error along a continuous motion of the mechanical transmission system upon a positioning of the control object to the second target position, based on the operated amount of the first mechanical element and the operated position of the second mechanical position, setting a second lost motion correction value for canceling the dynamic lost motion error, and correcting, by the second lost motion correction value, a second control command for positioning the control object to the second target position.

Further, to achieve the object described, according to a third aspect of the invention, there is provided a lost motion correction system for a numerical control machine tool for correcting a lost motion error of a mechanical transmission system including a first mechanical element to be operated in accordance with a control command from a control program and a second mechanical element for positioning a control object to target positions. This lost motion correction system comprises a first detector configured to detect an operated amount of the first mechanical element, a second detector configured to detect an operated position of the second mechanical element, a recognizer configured to recognize from the control program that the control object stops at a first target position, a calculator configured to calculate a stationary lost motion error as a lost motion error along a motion stop of the mechanical transmission system upon a positioning of the control object to the first target position, based on the operated amount of the first mechanical element and the operated position of the second mechanical position, a setter configured to set a first lost motion correction value for canceling the stationary lost motion error, and a corrector configured to correct, by the first lost motion correction value, a first control command for positioning the control object to the first target position.

According to a fourth aspect of the invention, in a lost motion correction system according to the third aspect, the recognizer is configured to recognize from the control program that the control object changes a moving direction at a second target position, the calculator is configured to calculate a dynamic lost motion error as a lost motion error along a continuous motion of the mechanical transmission system upon a positioning of the control object to the second target position, based on the operated amount of the first mechanical element and the operated position of the second mechanical position, the setter is configured to set a second lost motion correction value for canceling the dynamic lost motion error, and the corrector is configured to correct, by the second lost motion correction value, a second control command for positioning the control object to the second target position.

Further, to achieve the object described, according to a fifth aspect of the invention, there is provided a lost motion correction value setting method for a numerical control machine tool of a hybrid control system for performing a positional loop control by using machine position signals output from a position detecting scale for detecting a machine position and motor position signals output from a rotary encoder for detecting a rotation angle of a driving servo motor. This lost motion correction value setting method comprises executing a test program to periodically input the machine position signals and the motor position signals, calculating differences between the machine position signals and the motor position signals to determine errors, calculating a difference between an average value on an advance side and an average value on a return side of the errors, and holding the difference as a dynamic lost motion correction value.

According to a sixth aspect of the invention, in a lost motion correction value setting method according to the fifth aspect, an arc interpolation or a linear reciprocal axis control is performed by the test program, and the lost motion correction value is calculated to be held for each feed axis.

According to a seventh aspect of the invention, in a lost motion correction value setting method according to the fifth or sixth aspect, $X_i$ is defined as a coordinate of a target position to be designated at an i-th time with respect to an arbitrary coordinate axis X by the test program, and a decision of the advance side and the return side is automatically made in a manner in which a coordinate $X_{i-1}$ is deemed as a reverse position when three coordinates $X_i$, $X_{i-1}$, and $X_{i-2}$ to be contiguously designated meet a condition of $(X_i-X_{i-1})(X_{i-1}-X_{i-2})<0$.

Further, to achieve the object described, according to an eighth aspect of the invention, there is provided a lost motion correction value setting method for a numerical control machine tool of a hybrid control system for performing a positional loop control by using machine position signals output from a position detecting scale for detecting a machine position and motor position signals output from a rotary encoder for detecting a rotation angle of a driving servo motor. This lost motion correction value setting method comprises executing a test program to perform a reciprocal pitch feed, inputting the machine position signals obtained at respective stop positions on an advance side and at respective stop positions on a return side of identical command positions, and storing an average value of differences therebetween as a stationary lost motion correction value.

According to a ninth aspect of the invention, there is provided a computer readable recording medium for recording a program for executing on a computer a lost motion correction value setting method according to any of the fifth to eighth aspect.

According to a tenth aspect of the invention, there is provided a numerical control machine tool of a hybrid control system having a computerized numerical controller for executing a lost motion correction value setting method according any of the fifth to eighth aspect.

BRIEF DESCRIPTION OF THE ACCOMPANYING DRAWINGS

The above and further objects and novel features of this invention will more fully appear from the following detailed description when the same is read in conjunction with the accompanying drawings, in which:

FIG. 4 is a data table for holding lost motion correction values;

Figure 10:
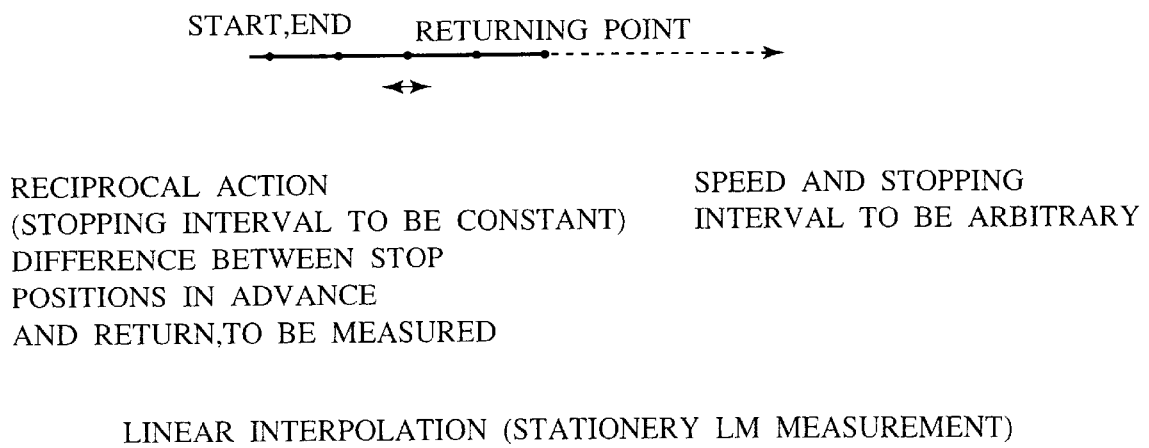
Figure 9:
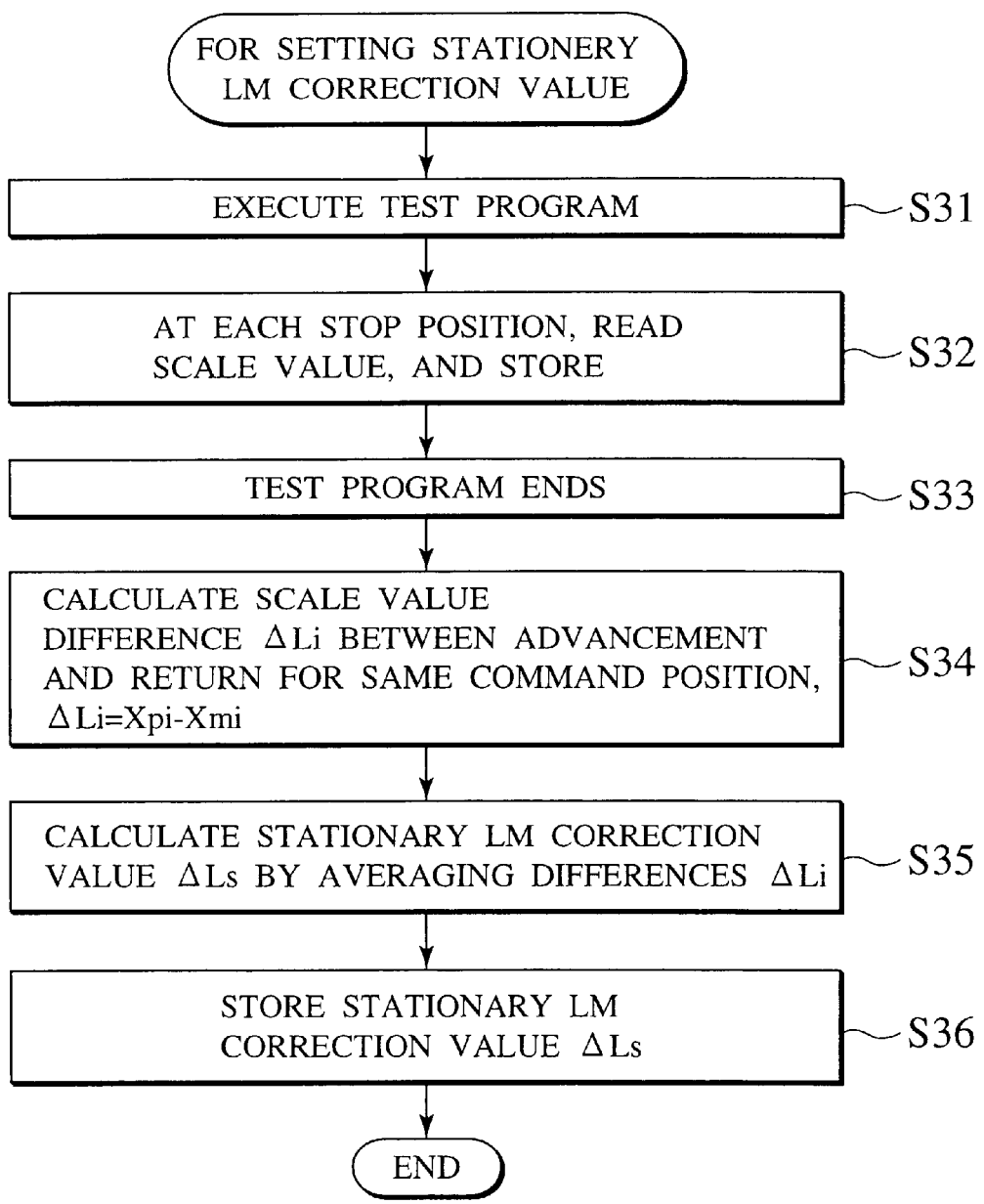

FIG. 9 is a flow chart showing an embodiment of a stationary lost motion correction value setting process in a lost motion correction value setting method for a numerical control machine tool of a hybrid control system according to this invention; and FIG. 10 is a diagram schematically describing a calculation of a stationary lost motion correction value in a lost motion correction value setting method for a numerical control machine tool of a hybrid control system according to this invention.

DETAILED DESCRIPTION OF THE PREFERRED EMBODIMENTS

There will be detailed below the preferred embodiments of this invention with reference to the accompanying drawings. Like members are designated by like reference characters.

Figure 1:
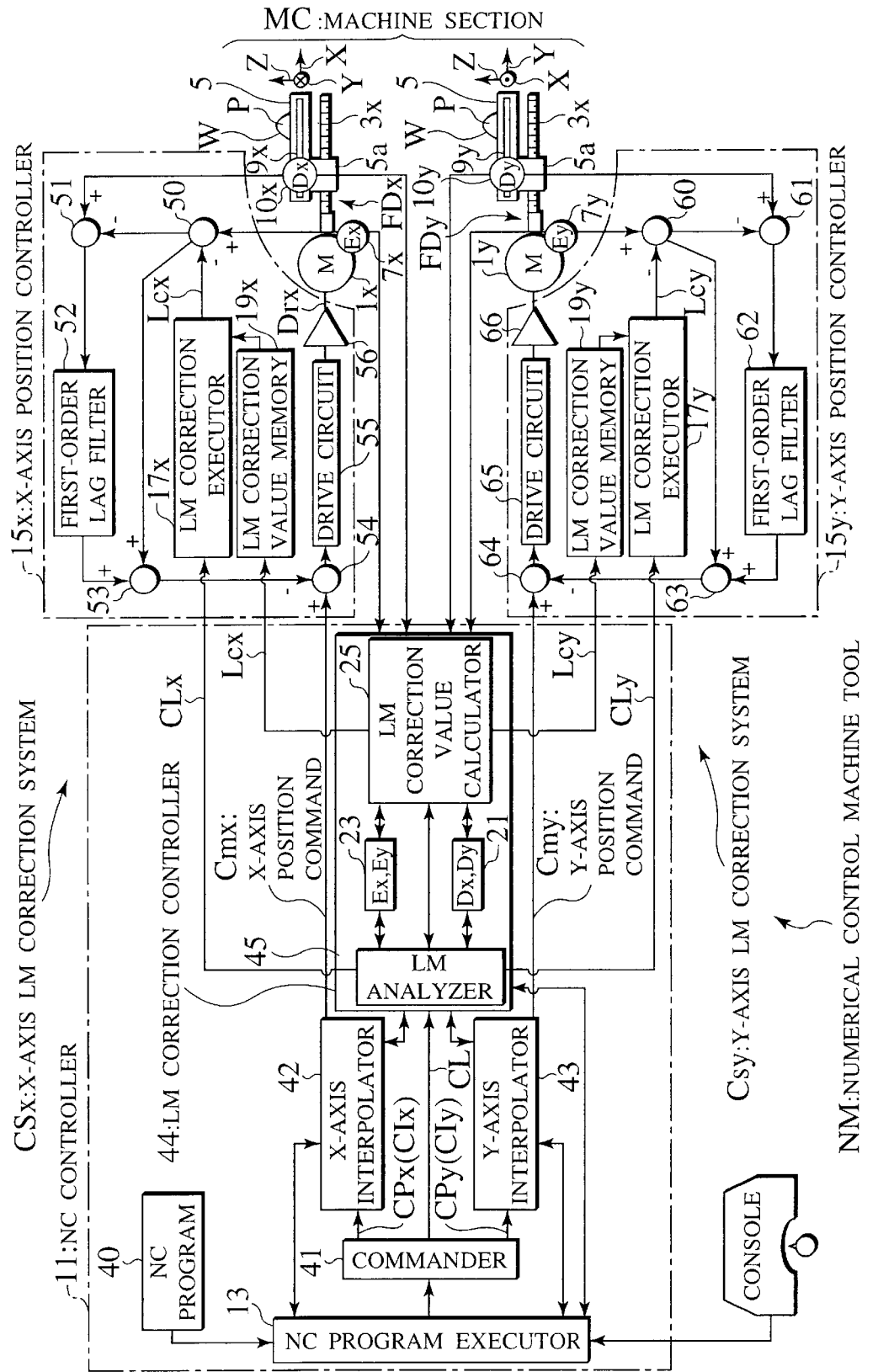
FIG. 1 is a block diagram of a numerical control machine tool according an embodiment of this invention.
Figure 2:
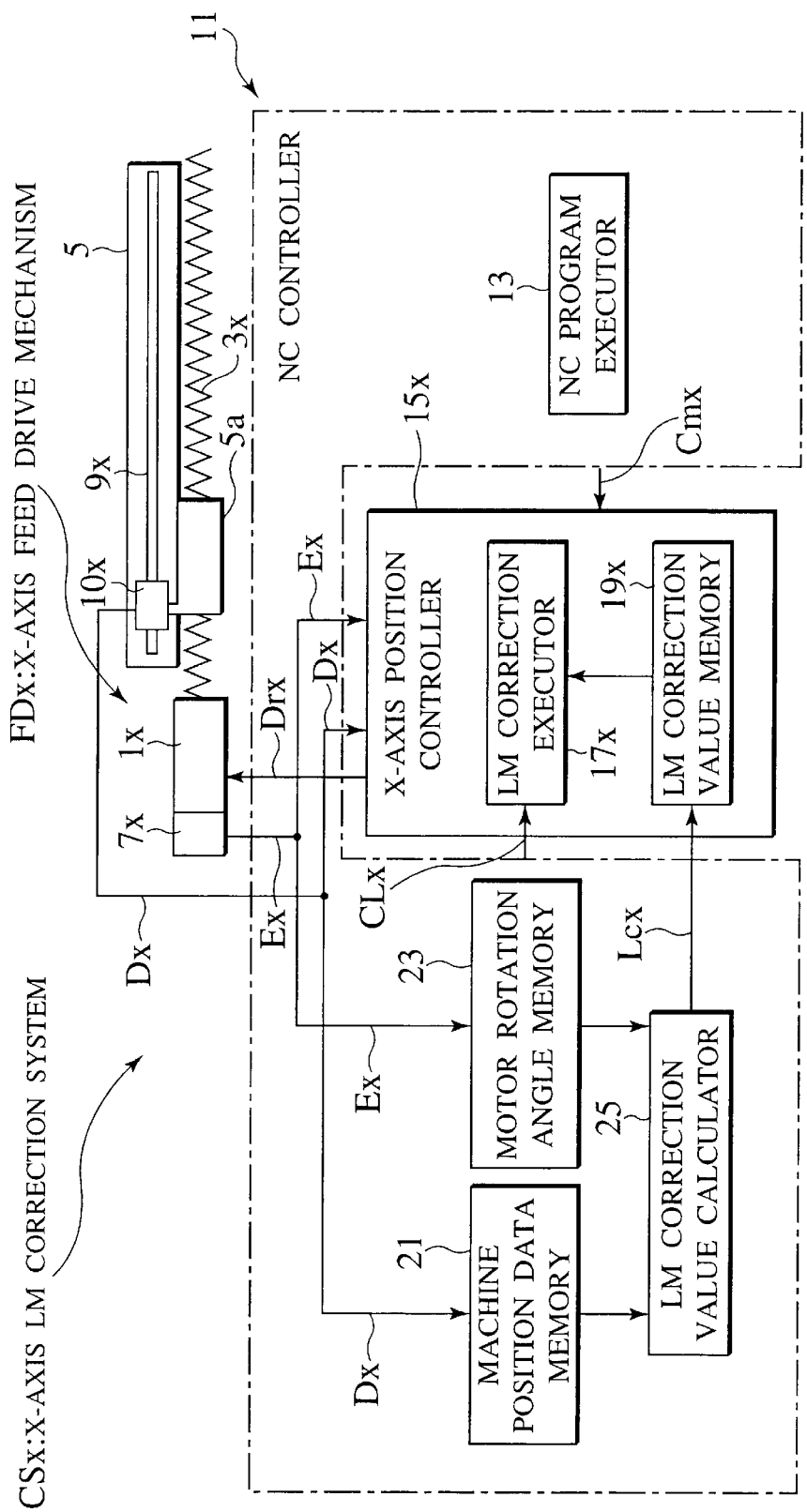
FIG. 2 is a block diagram of a lost motion correction system for X-axis of the numerical control machine tool of FIG. 1.
Figure 3A:
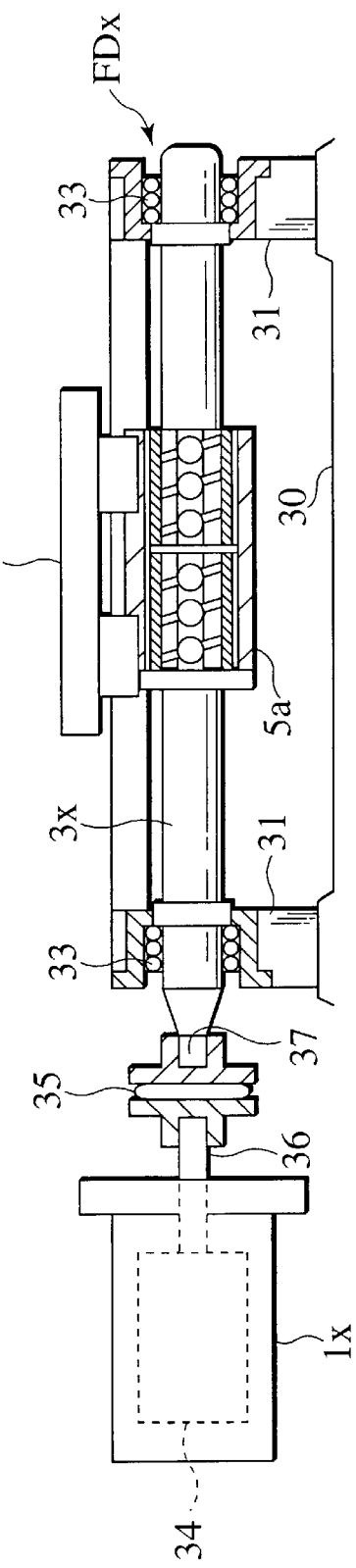
FIG. 3A is a partially cut-away side view of an X-axis feed drive mechanism as an example of a mechanical transmission system including a frictional coupling, of which lost motions are corrected in the correction system of FIG. 2.
Figure 3B:
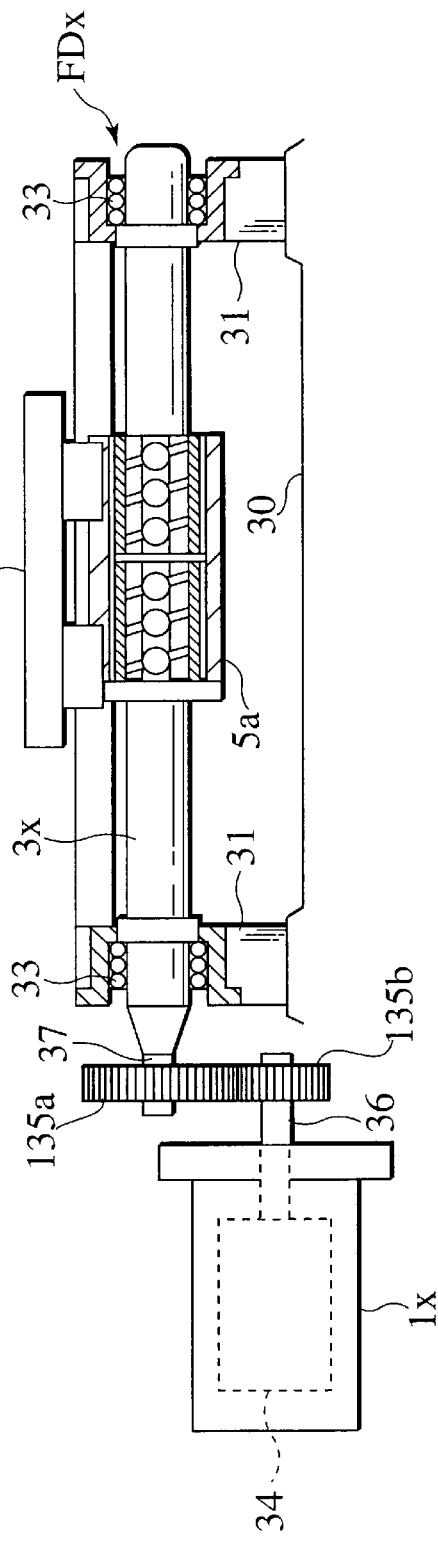
FIG. 3B is a partially cut-away side view of an X-axis feed drive mechanism as an example of a mechanical transmission system including gears, of which lost motions are corrected in the correction system of FIG. 2.

FIG. 1 shows in a block diagram a numerical control machine tool NM according an embodiment of this invention, FIG. 2 shows in a block diagram an essential portion of a lost motion correction system CSx for X-axis of the numerical control machine tool NM, and FIG. 3A and FIG. 3B each show in a partially cut-away side view an X-axis feed drive mechanism FDx as a mechanical transmission system of which lost motions are corrected in the correction system CSx.

As shown in FIG. 1, the numerical control machine tool NM is governed by a console, and constituted with an NC controller 11, an X-axis position controller 15x, a Y-axis position controller 15y, and a machine section MC. The NC controller 11 executes an NC program to provide an X-axis position command Cmx and a Y-axis position command Cmy. The X-axis position controller 15x corrects the X-axis position command Cmx by a loop control of negative feedback system to output a drive signal Drx for controlling an X-axis position of a workpiece W. The Y-axis position controller 15y corrects the Y-axis position command Cmy by a loop control of negative feedback system to output a drive signal Dry for controlling a Y-axis position of the workpiece W. The machine section MC performs mechanical actions in dependence on the drive signals Drx and Dry to displace the workpiece W along an X-Y plane.

The machine section MC has a table 5, an X-axis feed drive mechanism FDx, and a Y-axis feed drive mechanism Fdy. The table 5 is configured to directly or indirectly hold a control object P (a part of the workpiece W to be processed, in this case) in a processing spatial region defined by an X-axis, a Y-axis, and a Z-axis orthogonally crossing each other. The X-axis feed drive mechanism FDx and the Y-axis feed drive mechanism FDy feed the table 5 in a direction of the X-axis and a direction of the Y-axis in accordance with the drive signals Drx and Dry, respectively.

The feed drive mechanisms FDx and Fdy are identical in constitution and, as illustrated in FIG. 2 or FIG. 3A or 3B, each constituted with a bed 30, front and rear or left and right brackets 31, a guide 32, a nut 5a or 5b, a ball screw 3x or 3y, a servo motor 1x or 1y, and a frictional coupling 35 (FIG. 3A) or gears 135a and 135b (FIG. 3B). The bed 30 serves as a machine frame, and the brackets 31 are fixed to the bed 30. The guide 32 is supported by the brackets 31 and extends in the X-axis direction or Y-axis direction, to support the table 5 to be slidable. The nut 5a or 5b is integrally provided with the table 5. The ball screw 3x or 3y engages with the nut 5a or 5b and extends in the X-axis direction or Y-axis direction, to be supported by bearings 33 mounted on corresponding brackets 31. The servo motor 1x or 1y has an incorporated rotor 34 that rotates at an angular position in dependence on the drive signal Drx or Dry. The frictional coupling 35 or gears 135a and 135b interconnect(s) a drive torque output shaft 36 of the servo motor 1x or 1y and a drive torque input end 37 of the ball screw 3x or 3y.

The feed drive mechanism FDx or FDy acts as a mechanical displacement transmission system. In this transmission system, the output shaft 36 of the servo motor 1x or 1y constitutes a mechanical element that makes a rotary displacement in accordance with the drive signal Drx or Dry, and the nut 5a or 5b constitutes a mechanical element that makes a horizontal displacement for transferring the table 5, to thereby indirectly position the control object P in a current position control cycle (hereafter called "current cycle") to a target position Pc {Xc=X($t_c$)[variable], Yc=Y($t_c$)[variable], Zc=Z($t_c$) [level of the part P to be processed=constant], where $t_c$ is a time representing the current cycle}. This transmission system has a dynamic lost motion error caused when the displacement of the nut is reversed in sense, as the position control cycle advances, and a stationary lost motion error caused when it stops.

As shown in FIG. 1 and FIG. 2, each feed drive mechanism FDx or FDy is provided with a linear scale 9x or 9y, a mechanical position detector 10x or 10y, and a rotary encoder 7x or 7y. The linear scale 9x or 9y extends along the ball screw 3x or 3y in the X-axis direction or Y-axis direction. The mechanical position detector 10x or 10y is integrally provided with the nut 5a or 5b, and detects a corresponding position of the linear scale 9x or 9y as a machine position data Dx or Dy of a positioning element (5a or 5b) in the mechanical transmission system (Drx or Dry). The rotary encoder 7x or 7y detects a rotation angle Ex or Ey (more specifically, a rotational position of the output shaft 36 or rotor 35) of the servo motor 1x or 1y, as a data that represents an operated amount of a rotating element (36) in the mechanical transmission system (Drx or Dry).

The NC controller 11 is constituted with an NC program executor 13 for executing the NC program 40, a commander 41, and an X-axis interpolator 42 and a Y-axis interpolator 43, and in this embodiment further includes a lost motion correction controller 44.

The NC program 40 includes a sequence of NC control blocks adapted for an actual processing and for a trial run with the purpose of setting lost motion correction values by conditions (table position, table speed, type of interpolation, dynamic/stationary lost motion error).

By execution of the NC program 40, the NC program executor 13 follows this program 40 so that it adequately refers to control data (NC control data, interpolation control data, and lost motion control data) used in a previous NC control block and a current NC control block, and calculates and stores in advance NC control target positions, of the control object P at a start point and an end point of a subsequent NC control block. The NC program executor 13 then decides if a positional interpolation control is necessary between those target positions, and determines the type of interpolation (for example, arc interpolation, linear interpolation, etc.), as necessary. Then, it generates necessary commands (as a combination of an X-axis or Y-axis positin control command CPx or CPy containing associated NC control target positions, an X-axis or Y-axis interpolation command CLx or CIy, a lost motion correction command CL, and/or associated data), and stores them, as necessary.

The commander 41 sequentially distributes the commands generated by the NC program executor 13 together with execution commands.

The X-axis interpolator 42 and the Y-axis interpolator 43 are responsible for the interpolation command CIx or CIy (contained in the position control commands CPx or CPy) received from the commander 41, to calculate and store, as interpolation target positions, those coordinates of a plurality of positions on an interpolation locus to be described by the control object P between the current and subsequent NC control target positions. Then, the interpolators 42 and 43 output an X-axis position command Cmx and a Y-axis position command Cmy respectively containing an X-axis coordinate Xs and a Y-axis coordinate of a target position Ps {Xs=X($t_s$), Ys=Y($t_s$), Zs=Z($t_s$) [=Z($t_c$): Z-axis component will be omitted hereafter.], where $t_s$ is a time representing a subsequent position control cycle (hereafter called "subsequent cycle")} to be taken by the control object P in the subsequent cycle, from among the NC control target positions and the interpolation control target positions.

The lost motion correction controller 44 is adapted to support and control a later-described lost motion correction in dependence on a lost motion correction command CL received from the commander 41. The lost motion correction controller 44 is constituted with a machine position data memory 21, a motor rotation angle memory 23, a lost motion analyzer 45, and a lost motion correction value calculator 25.

The machine position data memory 21 stores mechanical position data Dy and Dy detected by the machine position detectors 10x and 10y.

The motor rotation angle memory 23 stores rotation angles of the servo motors 1x and 1y detected by the rotary encoders 7x and 7y.

The lost motion analyzer 45 refers to, and stores for adequate periods, the data Dx, Dy, Ex, and Ey stored in the memories 21 and 23, and such a target position Pp {Xp=X($t_p$), Yp=Y($t_p$), where $t_p$ is a time representing a previous position control cycle (hereafter called "previous cycle")} in the previous cycle, target positions Pc and Ps in the current and subsequent cycles, and X-axis and Y-axis lost motion correction values Lcx and Lcy in the current and subsequent cycles that are stored in the X-axis interpolator 42 and the Y-axis interpolator 43. Then, for supporting the lost motion correction, the analyzer 45 performs necessary analysis operations (for example, prediction of X-axis components and Y-axis components of a real position and a real speed of the table 5 in the subsequent cycle) and decision operations (for example, decision on the type of interpolation, decision on a dynamical type of lost motion error, i.e., whether dynamic lost motion error or stationary lost motion error, and discrimination of the sense of movement in a linear interpolation). It then generates X-axis and Y-axis control commands CLx and CLy containing a result of those operations (to be a lost motion correction value setting condition in the trial run, or a lost motion correction value selecting condition in the real processing) and necessary timing information for the lost motion correction control).

The lost motion correction value calculator 25 is adapted, in the trial run, for referring to the data Dx, Dy, Ex, and Ey and operation results of the lost motion analyzer 45, to calculate X-axis and Y-axis lost motion correction values Lcx and Lcy of the subsequent cycle.

The lost motion correction controller 44 cooperates with the X-axis position controller 15x to constitute an X-axis lost motion correction system CSx (see FIG. 1 and FIG. 2), and with the Y-axis position controller 15y to constitute a Y-axis lost motion correction system CSy (see FIG. 1). The X-axis lost motion correction system CSx performs a correction of the X-axis position command Cmx for canceling an X-axis component of such a lost motion in the current cycle of the feed drive mechanism FDx (and the feed drive mechanism FDy if necessary) that was predicted in the previous cycle, to thereby provide the X-axis drive signal Drx. The Y-axis lost motion correction system CSy performs a correction of the Y-axis position command Cmy for canceling a Y-axis component of such a lost motion in the current cycle of the feed drive mechanism FDy (and the feed drive mechanism FDx if necessary) that was predicted in the previous cycle, to thereby provide the Y-axis drive signal Dry.

It is noted that the results of operations performed in the NC controller 11 for use in a subsequent cycle are input to the X-axis position controller 15x and Y-axis position controller 15y in a timing synchronized with an execution timing of the current timing in the controllers 15 and 15y (that is, at a timing in a viewpoint shifted by one cycle).

The X-axis position controller 15x is constituted with a lost motion correction value memory 19x, a lost motion correction executor 17x, nodes as software elements (hereafter each respectively simply called "node") 50, 51, 53, and 54, a first-order lag filter 52, a motor drive circuit 55, and an amplifier 56. The lost motion correction value memory 19x serves as a data buffer that has a data table (see FIG. 4) prepared with lost motion correction values Lcx held by conditions for the X-axis at respective position control cycles in a trial run. The lost motion correction executor 17x is responsible for the X-axis control command CLx in the trial run and in a real processing, to read and output a corresponding lost motion correction value Lcx of the lost motion correction value memory 19x, to thereby execute a lost motion correction with respect to the X-axis. The output Lcx of the lost motion correction executor 17x is subtracted from an output Ex of the rotary encoder 7x, at the node 50, and an output of this node 50 is subtracted from an output Dx of the machine position detector 10x, at the node 51. An output of this node 51 is delayed by the first-order lag filter 52. An output of this filter 52 and the output of the node 50 are added at the node 53, and an output of this node 53 is subtracted from the X-axis position command Cmx, at the node 54. The motor drive circuit 55 is operated in dependence on an output of this node 54, and an output of the motor drive circuit 55 is amplified by the amplifier 56, to thereby drive the step motor 1x for the X-axis.

The Y-axis position controller 15y is constituted with a lost motion correction value memory 19y, a lost motion correction executor 17y, nodes 60, 61, 63, and 64, a first-order lag filter 62, a motor drive circuit 65, and an amplifier 66. The lost motion correction value memory 19y serves as a data buffer that has a data table (see FIG. 4) prepared with lost motion correction values Lcy held by conditions for the Y-axis at respective position control cycles in the trial run. The lost motion correction executor 17y is responsible for the Y-axis control command CLy in the trial run and in the real processing, to read and output a corresponding lost motion correction value Lcy of the lost motion correction value memory 19y, to thereby execute a lost motion correction with respect to the Y-axis. The output Lcy of the lost motion correction executor 17y is subtracted from an output Ey of the rotary encoder 7y, at the node 60, and an output of this node 60 is subtracted from an output Dy of the machine position detector 10y, at the node 61. An output of this node 61 is delayed by the first-order lag filter 62. An output of this filter 62 and the output of the node 60 are added at the node 63, and an output of this node 63 is subtracted from the Y-axis position command Cmy, at the node 64. The motor drive circuit 65 is operated in dependence on an output of this node 64, and an output of the motor drive circuit 65 is amplified by the amplifier 66, to thereby drive the step motor 1y for the Y-axis.

Thus, at the position controllers 15x and 15y, there are employed, in correspondence to the position commands CLx and CLy from the NC controller 11, machine position signals Dx and Dy from the position detectors 10x and 10y and motor rotation angle position signals Ex and Ey from the rotary encoders 7x and 7y, to thereby perform a position loop control of a full-close/semi-close hybrid control system so that, depending on positional deviations resulted therefrom, the driving of the servo motors 1x and 1y is controlled As an NC program for trial run (hereafter called "test program") is executed by the NC program executor 13, machine position signals Dx and Dy from the position detecting scales 9x and 9y are stored as machine position data in the machine position data memory 21 and motor position signals Ex and Ey from the rotary encoders 7x and 7y are stored as motor rotation angle data in the motor rotation angle data memory 23. Based on those data, the lost motion correction value calculator 25 calculates dynamic lost motion correction values and stationary lost motion correction values for axes and conditions, and the lost motion correction values thus calculated are held by conditions in data tables of the lost motion correction value memories 19x and 19y, as shown in FIG. 4.

Figure 5:
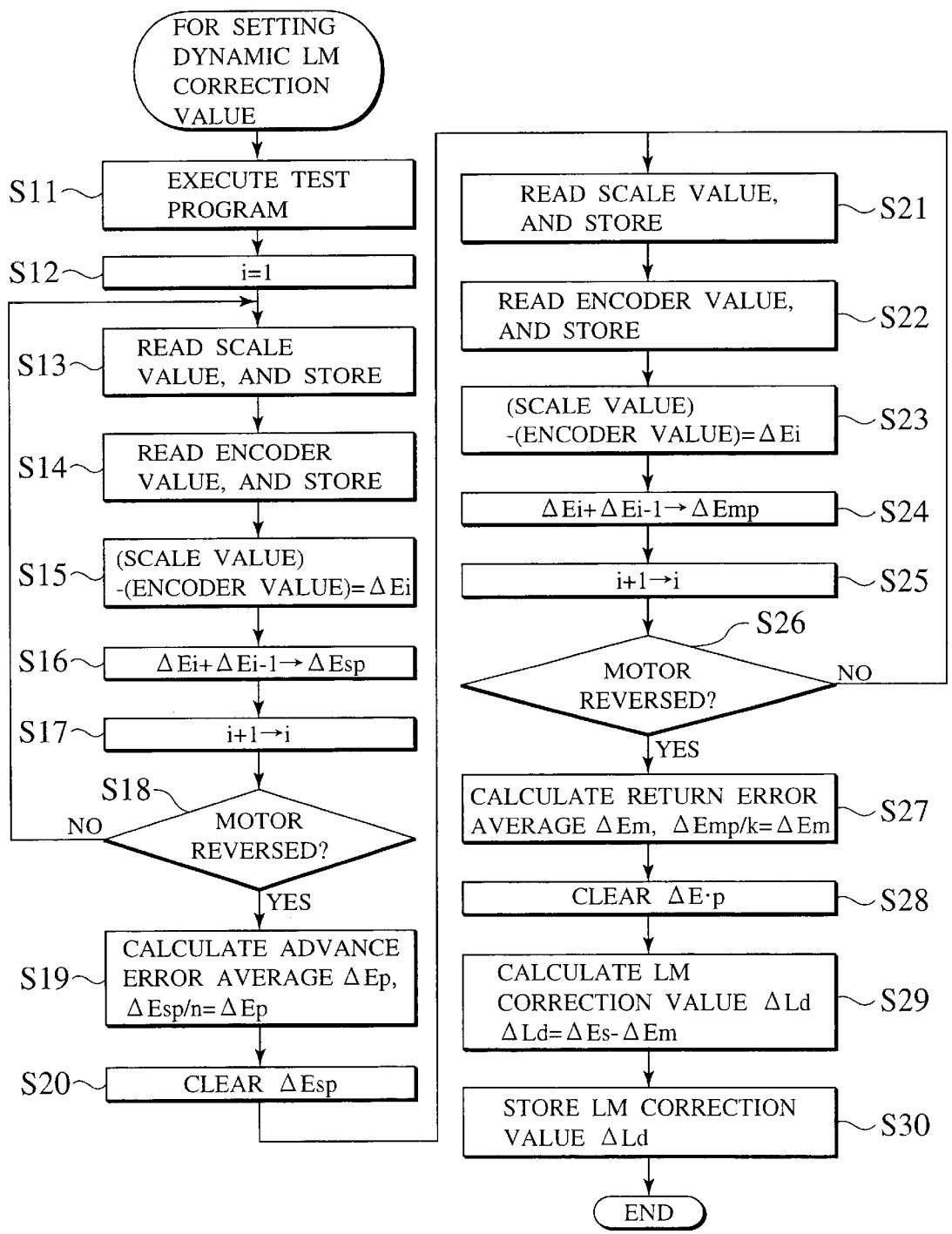
FIG. 5 is a flow chart showing an embodiment of a dynamic lost motion correction value setting process in a lost motion correction value setting method for a numerical control machine tool of a hybrid control system according to this invention.

Now, a setting process of dynamic lost motion correction values will be described with reference to FIG. 5. A test program for setting a dynamic lost motion correction value is executed (step S11). At this step, an arc interpolation or linear reciprocal axis control is performed. The number of times of sampling is set at i=1 (step S12). At a prescribed sampling period, scale values (machine position signals) and encoder values (mortar position signals) are periodically read, and stored in a machine position data memory 21 and a motor rotation angle memory 23, respectively (steps S13 and S14). An error $\Delta E_i$ is calculated by a subtraction of (scale value)–(encoder value) (step S15). Advance errors are integrated by $\Delta E_i + \Delta E_{i-1}$ (step S16).

Figure 6:
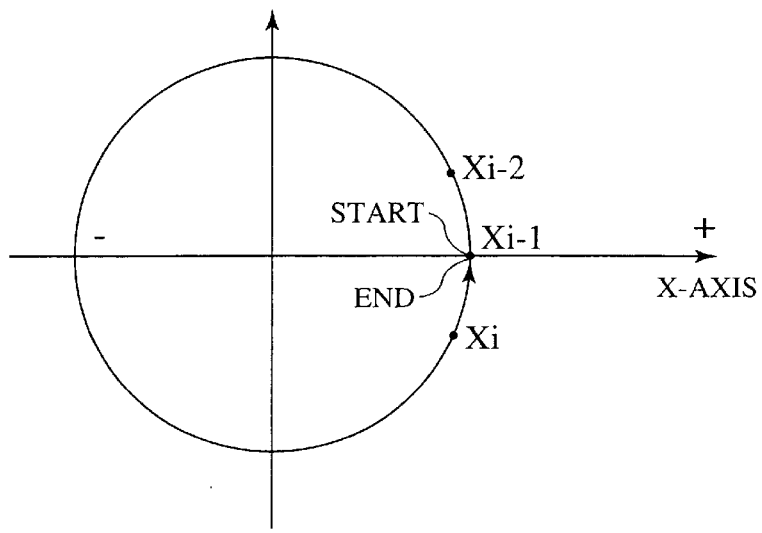
FIG. 6 is a diagram describing a motor reverse rotation decision procedure in a lost motion correction value setting method for a numerical control machine tool of a hybrid control system according to this invention.

Then, the number i of times of sampling is incremented by 1 (step S17), and it is determined whether the motor is reversed or not (step S18). The determination of reverse of the motor constitutes an automatic determination of advance or return. The difference between an arbitrary coordinate position $X_i$ and $X_{i-1}$ ($X_i - X_{i-1}$), and the difference between $X_{i-1}$ and $X_{i-2}$ ($X_{i-1} - X_{i-2}$) are determined. If they meet the equation ($X_i - X_{i-1}$) ($X_{i-1} - X_{i-2}$)<0, the coordinate position $X_{i-1}$ is regarded as the reversing position. For example, in an arc interpolation as shown in FIG. 6, ($X_{i-1} - X_{i-2}$) has a positive value and ($X_i - X_{i-1}$) has a negative value. Thus when ($X_i - X_{i-1}$) ($X_{i-1} - X_{i-2}$)<0, the coordinate position of $X_{i-1}$ constitutes a reversing position with respect to an X-axis.

The steps S13 to S18 are repeated until the motor is reversed. When the motor is reversed, the integrated value of errors $\Delta$Esp is divided by an advance sampling number II to calculate an advance error average $\Delta$Ep (step S19).

Then the integrated value $\Delta$Esp is cleared (step S20). Sequentially at a prescribed sampling period, scale values (machine position signals) and encoder values (motor position signals) are periodically read and stored in the machine position data memory 21 and the motor rotation angle memory 23, respectively (steps S21 and S22). An error $\Delta E_i$ is calculated by a subtraction of (scale value)–(encoder value) (step S23). Return error values are integrated by $\Delta E_i + \Delta E_{i-1}$ (step S24).

Then the number i of times of sampling is incremented by 1 (step S25), and it is determined whether the motor is reversed or not (step S26). The steps S21 to S26 are repeated until the motor is reversed. When the motor is reversed, the integrated value of errors $\Delta$Esm is divided by a return sampling number k to calculate a return error average $\Delta$Em (step S27). The return sampling number k can be the same as the advance sampling number n.

Then, the integrated value $\Delta$Ems is cleared (step S28). The difference between the advance error average $\Delta$Ep and the return error average $\Delta$Em is determined to write and save it in a lost motion correction value memory 19 as a dynamic lost motion correction value $\Delta$Ld (steps S29 and 30).

Figure 7:
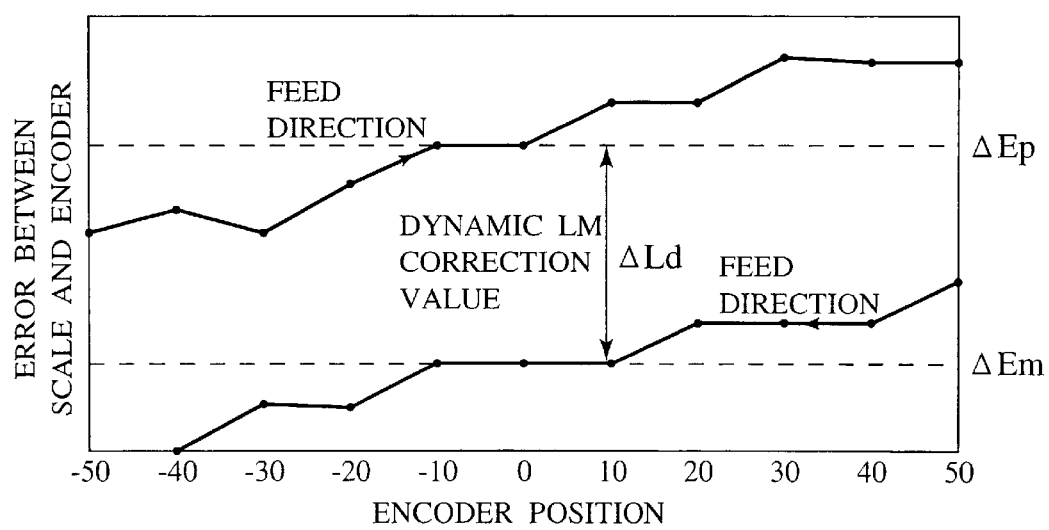
FIG. 7 is a diagram schematically describing a calculation of a dynamic lost motion correction value in a lost motion correction value setting method for a numerical control machine tool of a hybrid control system according to this invention.

In the above-described manner, the dynamic lost motion correction value $\Delta$Ld can be automatically set. FIG. 7 schematically shows the calculation of the dynamic lost motion correction value $\Delta$Ld.

Figure 8:
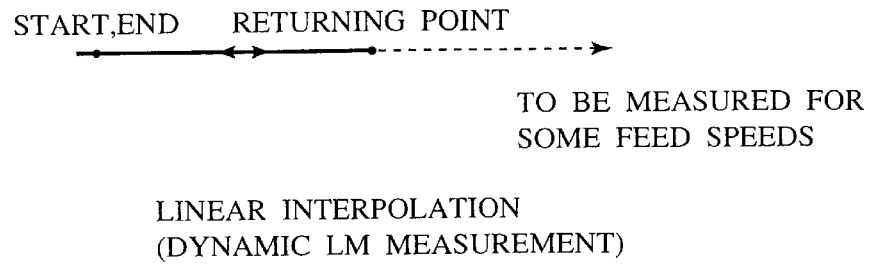
FIG. 8 is a diagram schematically describing a calculation of a dynamic lost motion correction value in a lost motion correction value setting method for a numerical control machine tool of a hybrid control system according to this invention.

FIG. 8 schematically shows the calculation of the dynamic lost motion correction value in a linear interpolation.

Now, a setting process of a stationary lost motion correction value will be described with reference to FIG. 9. A test program for setting a stationary lost motion correction value is executed (step S31). At this step, a reciprocal pitch feed as shown in FIG. 10 is conducted. A scale value (machine position signals) at each advance stop position and each return stop position is read and stored (step S32).

When the reciprocal pitch feed over a prescribed stroke is completed, the test program is terminated (step S33). The difference $\Delta$Li between an advance scale value Xpi and a return scale value Xmi at the same command position is calculated for each stop position (step S34). The average value thereof all over the strokes is calculated (step S35) and written and saved in the lost motion correction value memory 19 as a stationary lost motion correction value $\Delta$Ls (step S36).

The above-described setting process of dynamic and stationary lost motion correction values does not require a special high-precision measuring instrument, and can be performed any time only with an instruction from a console (such as a menu selection) at the user end.

The setting method of lost motion correction values described in the above embodiment can be implemented by executing a previously prepared program with a computer numerical control. This program is recorded in a computer readable recording medium such as a hard disc, floppy disk, or CD-ROM, and is read from the recording medium to be executed by the computer.

As will be seen from the above description, there is provided a lost motion correction method and a lost motion correction system for a numerical control machine tool that allows a necessary precision for processing to be kept by measuring stationary lost motion errors with their kinetic properties in view, even with a moderated measuring precision.

Further, there is provided a lost motion correction method and a lost motion correction system for a numerical control machine tool that allows a necessary precision for processing to be kept by measuring dynamic lost motion errors with their kinetic properties in view, even with a moderated measuring precision.

The setting method of lost motion correction values for a machine tool of a hybrid control system comprises executing a test program; periodically inputting machine position signals outputted by a position detecting scale provided in the machine tool of the hybrid control system and motor position signals outputted by a rotary encoder; determining an error by the subtraction of motor position signals from the machine position signals, determining the difference between an average value on an advance side and an average value on a return side of the errors; and storing the difference as a dynamic lost motion correction value. Therefore, in this method, a special high-precision measuring instrument is not required and a dynamic lost motion correction value can be automatically set.

The setting method of lost motion correction values of a machine tool of a hybrid control system comprises performing an arc interpolation or linear reciprocal axis control with a test program, and determining and storing a lost motion correction value for each feed axis. Therefore in this method, a special high-precision measuring instrument is not required and a dynamic lost motion correction value for each axis can be automatically set.

The setting method of lost motion correction values of a machine tool of a hybrid control system comprises: determining the difference between an arbitrary coordinate position $X_i$ and $X_{i-1}$ ($X_i-X_{i-1}$), and the difference between the coordinate position $X_{i-1}$ and $X_{i-2}$ ($X_{i-1}-X_{i-2}$); when the equation $(X_i-X_{i-1})(X_{i-1}-X_{i-2})<0$ is met, automatically determining advance or return with the coordinate position $X_{i-1}$ as a returning position. Therefore in this process, advance and reverse are determined without a special means, and a dynamic lost motion correction value can be automatically set with high precision.

The setting method of lost motion correction values of a machine tool of a hybrid control system comprises: executing a test program; inputting machine position signals outputted from the position detecting scale provided in the machine tool of the hybrid control type; and storing a difference average of the machine position signals at each advance stop position and each return stop position at the same command position as a stationary lost motion correction value. Therefore in this process, a special high-precision measuring instrument is not required, and a stationary lost motion correction value is automatically set.

The computer readable recording medium of this invention stores a program for a computer to perform the lost motion correction method. Thus the program is machine-readable, resulting in a recording medium that permits a computerized numerical control unit to perform the process of this invention.

The numerical control unit of this invention performs the setting method of lost motion correction values. Therefore the CNC does not require a special high-precision measuring instrument, and automatically sets dynamic and stationary lost motion correction values.

While preferred embodiments of the present invention have been described using specific terms, such description is for illustrative purposes, and it is to be understood that changes and variations may be made without departing from the spirit or scope of the following claims.

What is claimed is:

1. A lost motion correction method for a numerical control machine tool for correcting a lost motion error of a mechanical transmission system including a first mechanical element to be operated in accordance with a control command from a control program and a second mechanical element for positioning a control object to target positions, the lost motion correction method comprising:

detecting an operated amount of the first mechanical element;

detecting an operated position of the second mechanical element;

recognizing from the control program that the control object stops at a first target position;

calculating a stationary lost motion error as a lost motion error along a motion stop of the mechanical transmission system upon a positioning of the control object to the first target position, based on the operated amount of the first mechanical element and the operated position of the second mechanical element;

setting a first lost motion correction value for canceling the stationary lost motion error;

correcting, by the first lost motion correction value, a first control command for positioning the control object to the first target position;

recognizing from the control program that the control object changes a moving direction at a second target position;

calculating a dynamic lost motion error as a lost motion error along a continuous motion of the mechanical transmission system upon a positioning of the control object to the second target position, based on the operated amount of the first mechanical element and the operated position of the second mechanical position;

setting a second lost motion correction value for canceling the dynamic lost motion error; and correcting, by the second lost motion correction value, a second control command for positioning the control object to the second target position.

2. A lost motion correction system for a numerical control machine tool for correcting a lost motion error of a mechanical transmission system including a first mechanical element to be operated in accordance with a control command from a control program and a second mechanical element for positioning a control object to target positions, the lost motion correction system comprising:

a first detector configured to detect an operated amount of the first mechanical element;

a second detector configured to detect an operated position of the second mechanical element;

a recognizer configured to recognize from the control program that the control object stops at a first target position and to recognize from the control program that the control object changes a moving direction at a second target position;

a calculator to calculate a stationary lost motion error as a lost motion error along a motion stop of the mechanical transmission system upon a positioning of the control object to the first target position, based on the operated amount of the first mechanical element and the operated position of the second mechanical position and to calculate a dynamic lost motion error as a lost motion error along a continuous motion of the mechanical transmission system upon a positioning of the control object to the second target position, based on the operated amount of the first mechanical element and the operated position of the second mechanical position;

a setter configured to set a first lost motion correction value for canceling the stationary lost motion error and to set a second lost motion correction value for canceling the dynamic lost motion error; and a corrector configured to correct, by first lost motion correction value, a first control command for positioning the control object to the first target position and to correct, by the second lost motion correction value, a second control command for positioning the control object to the second target position.

3. A lost motion correction value setting method for a numerical control machine tool of a hybrid control system for performing a positional loop control by using machine position signals output from a position detecting scale for detecting a machine position and motor position signals output from a rotary encoder for detecting a rotation angle of a driving servo motor, the lost motion correction value setting method comprising:

executing a test program to periodically input the machine position signals and the motor position signals;

performing an arc interpolation or a linear reciprocal axis control by the test program;

calculating differences between the machine position signals and the motor position signals to determine errors;

calculating a difference between an average value on an advance side and an average value on a return side of the errors;

holding the difference as a dynamic lost motion correction value; and calculating the lost motion correction value to be held for each feed axis.

4. A lost motion correction value setting method according to claim 3, wherein $X_i$ is defined as a coordinate of a target position to be designated at an i-th time with respect to an arbitrary coordinate axis X by the test program, and a decision of the advance side and the return side is automatically made in a manner in which a coordinate $X_{i-1}$ is deemed as a reverse position when three coordinates $X_1$, $X_{i-1}$, and $X_{i-2}$ to be contiguously designated meet a condition of $(X_i-X_{i-1})(X_{i-1}-X_{i-2})<0$.

5. A lost motion correction value setting method for a numerical control machine tool of a hybrid control system for performing a positional loop control by using machine position signals output from a position detecting scale for detecting a machine position and motor position signals output from a rotary encoder for detecting a rotation angle of a driving servo motor, the lost motion correction value setting method comprising:

executing a test program to perform a reciprocal pitch feed including
an advance pitch feed accompanying advance stops at a plurality of command positions to read a plurality of first scale values corresponding to machine positions of the advance stops, and
a return pitch feed accompanying return stops at the plurality of command positions to read a plurality of scale values corresponding to machine positions of the return stops;

calculating, for each command position, a scale value difference between
a corresponding first scale value and
a corresponding second scale value; and calculating an average of scale value differences of the plurality of command positions as a stationary lost motion correction value for each command position.

6. A computer readable recording medium for recording a program for executing on a computer a lost motion correction value setting method for a numerical control machine tool of a hybrid control system for performing a positional loop control by using machine position signals output from a position detecting scale for detecting a machine position and motor position signals output from a rotary encoder for detecting a rotation angle of a driving servo motor, the lost motion correction value setting method comprising:

executing a test program to periodically input the machine position signals and the motor position signals;

performing an arc interpolation or a linear reciprocal axis control by the test program;

calculating differences between the machine position signals and the motor position signals to determine errors;

calculating a difference between an average value on an advance side and an average value on a return side of the errors;

holding the difference as a dynamic lost motion correction value; and calculating the lost motion correction value to be held for each feed axis.

7. The computer readable recording medium according to claim 6, wherein $X_i$ is defined as a coordinate of a target position to be designated at an i-th time with respect to an arbitrary coordinate axis X by the test program, and a decision of the advance side and the return side is automatically made in a manner in which a coordinate $X_{i-1}$ is deemed as a reverse position when three coordinates $X_i$, $X_{i-1}$, and $X_{i-2}$ to be contiguously designated meet a condition of $(X_i-X_{i-1})(X_{i-1}-X_{i-2})<0$.

8. A numerical control machine tool of a hybrid control system having a computerized numerical controller for executing a lost motion correction value setting method for performing a positional loop control by using machine position signals output from a position detecting scale for detecting a machine position and motor position signals output from a rotary encoder for detecting a rotation angle of a driving servo motor, the lost motion correction value setting method comprising:

executing a test program to periodically input the machine position signals and the motor position signals;

performing an arc interpolation or a linear reciprocal axis control by the test program;

calculating differences between the machine position signals and the motor position signals to determine errors;

calculating a difference between an average value on an advance side and an average value on a return side of the errors;

holding the difference as a dynamic lost motion correction value; and calculating the lost motion correction value to be held for each feed axis.

9. The numerical control machine tool according to claim 8, wherein $X_i$ is defined as a coordinate of a target position to be designated at an i-th time with respect to an arbitrary coordinate axis X by the test program, and a decision of the advance side and the return side is automatically made in a manner in which a coordinate $X_{i-1}$ is deemed as a reverse position when three coordinates $X_i$, $X_{i-1}$, and $X_{i-2}$ to be contiguously designated meet a condition of $(X_i-X_{i-1})(X_{i-1}-X_{i-2})<0$.

10. A lost motion correction method for a numerical control machine tool for correcting a lost motion error of a mechanical transmission system including a first mechanical element to be operated in accordance with a control command from a control program and a second mechanical element for positioning a control object to target positions, the lost motion correction method comprising:

detecting an operated amount of the first mechanical element;

detecting an operated position of the second mechanical element;

recognizing from the control program that the control object stops at a first target position;

calculating a stationary lost motion error as a collective lost motion error due to a backlash and a winding along a motion stop of the mechanical transmission system upon a positioning of the control object to the first target position, based on the operated amount of the first mechanical element and the operated position of the second mechanical position;

setting a first lost motion correction value for canceling the stationary lost motion error; and correcting, by the first lost motion correction value, a first control command for positioning the control object to the first target position.

11. A lost motion correction method for a numerical control machine tool for correcting a lost motion error of a mechanical transmission system including a first mechanical element to be operated in accordance with a control command from a control program and a second mechanical element for positioning a control object to target positions, the lost motion correction method comprising:

detecting an operated amount of the first mechanical element;

detecting an operated position of the second mechanical element;

recognizing from the control program that the control object changes a moving direction at a second target position;

calculating a dynamic lost motion error as a collective lost motion error due to a backlash and a winding along a continuous motion of the mechanical transmission system upon a positioning of the control object to the second target position, based on the operated amount of the first mechanical element and the operated position of the second mechanical position;

setting a second lost motion correction value for canceling the dynamic lost motion error; and correcting by the second lost motion correction value, a second control command for positioning the control object to the second target position.

12. A computer readable recording medium for recording a program for executing on a computer a lost motion correction value setting method for a numerical control machine tool of a hybrid control system for performing a positional loop control by using machine position signals output from a position detecting scale for detecting a machine position and motor position signals output from a rotary encoder for detecting a rotation angle of a driving servo motor, the lost motion correction value setting method comprising:

executing a test program to perform a reciprocal pitch feed including an advance pitch feed accompanying advance stops at a plurality of command positions to read a plurality of first scale values corresponding to machine positions of the advance stops, and a return pitch feed accompanying return stops at the plurality of command positions to read a plurality of scale values corresponding to machine positions of the return stops;

calculating, for each command position, a scale value difference between a corresponding first scale value and a corresponding second scale value; and calculating an average of scale value differences of the plurality of command positions as a stationary lost motion correction value for each command position.

13. A numerical control machine tool of a hybid control system having a computerized numerical controller executing a lost motion correction value setting method for performing a positional loop control by using machine position signals output from a position detecting scale for detecting a machine position and motor position signals output from a rotary encoder for detecting a rotation angle of a driving servo motor, the lost motion correction value setting method comprising:

executing a test program to perform a reciprocal pitch feed including an advance pitch feed accompanying advance stops at a plurality of command positions to read a plurality of first scale values corresponding to machine positions of the advance stops, and a return pitch feed accompanying return stops at the plurality of command positions to read a plurality of scale values corresponding to machine positions of the return stops;

calculating, for each command position, a scale value difference between a corresponding first scale value and a corresponding second scale value; and calculating an average of scale value differences of the plurality of command positions as a stationary lost motion correction value for each command position.

\* \* \* \* \*

UNITED STATES PATENT AND TRADEMARK OFFICE
CERTIFICATE OF CORRECTION

PATENT NO. : 6,701,212 B2
DATED : March 2, 2004
INVENTOR(S) : Kazuhiro Shiba et al.

It is certified that error appears in the above-identified patent and that said Letters Patent is hereby corrected as shown below:

Column 12,
Line 55, insert -- configured -- after "calculator".

Column 13,
Line 41, "$(X_{i-1}\text{-}x_{i-2})$" should read -- $(X_{i-1}\text{-}X_{i-2})$ --.

Column 16,
Line 27, insert -- for -- after "controller".

Signed and Sealed this

Twenty-sixth Day of October, 2004

JON W. DUDAS
*Director of the United States Patent and Trademark Office*